(No Model.) 2 Sheets—Sheet 1.
G. W. WICKS.
APPARATUS FOR CASTING PLUMBERS' TRAPS.
No. 359,754. Patented Mar. 22, 1887.
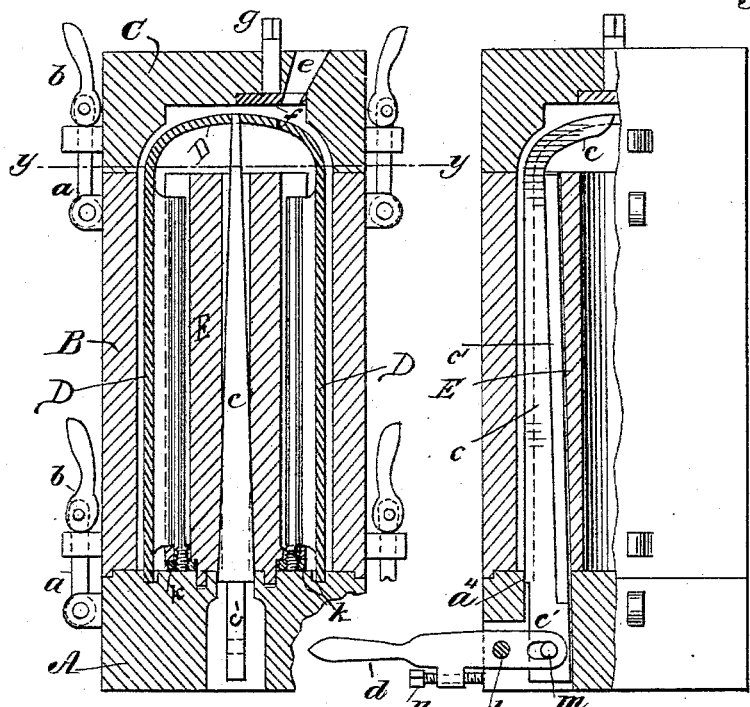
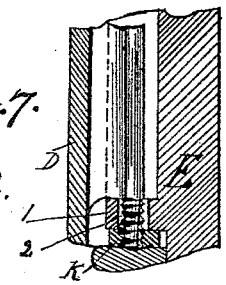
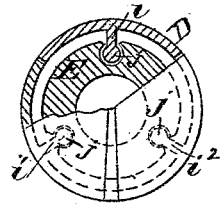
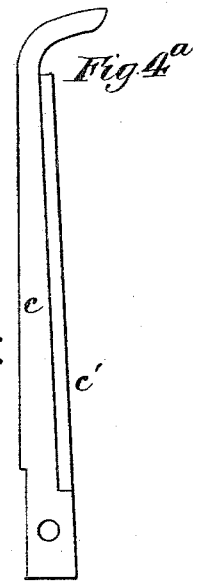
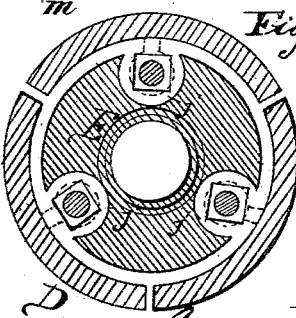
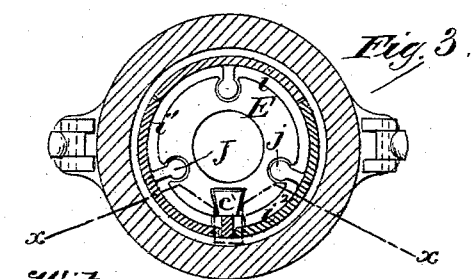
Witnesses
H. F. Parker.
W. E. Bowen.
Inventor.
George W. Wicks,
By J. Ell Bowen
Attorney.
N. PETERS, Photo-Lithographer, Washington, D.C.

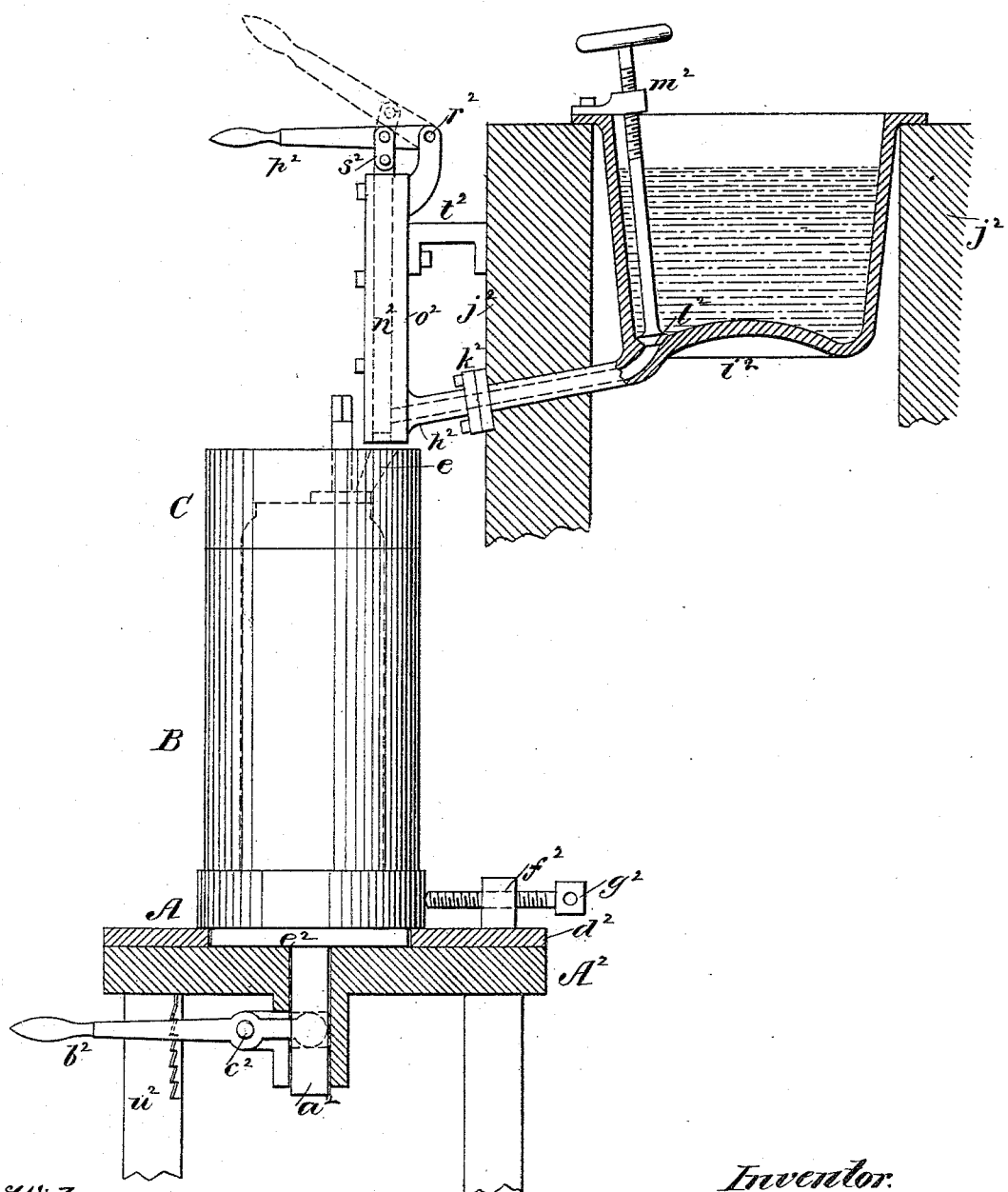

United States Patent Office.

GEORGE W. WICKS, OF BROOKLYN, NEW YORK, ASSIGNOR TO ARCHIBALD E. McKECHNIE, OF LYNN, MASSACHUSETTS.

APPARATUS FOR CASTING PLUMBERS' TRAPS.

SPECIFICATION forming part of Letters Patent No. 359,754, dated March 22, 1887.

Application filed February 10, 1886. Serial No. 191,492. (No model.)

*To all whom it may concern:*

Be it known that I, GEORGE W. WICKS, a citizen of the United States, and a resident of Brooklyn, in the county of Kings and State of New York, have invented certain new and useful Improvements in Apparatus for Making Plumbers' Traps, of which the following is a specification.

This invention relates to means for producing what are known as "plumbers' traps," and particularly that type of trap which I have designated the "fountain-trap," and which consists of an elongated cylindrical vessel with a contracted mouth provided with a female nut and screw-threaded cover.

Traps of this description have their body portion of lead, and the cover and screw-threaded nut, within the neck, of brass, and the body portion has been heretofore generally made by hand with the ordinary tools for shaping hollow bodies in lead. The objectionable solder joints in the hand-made traps and the expense attending the producing of the traps have been serious drawbacks to the introduction into general use of this type of device for effecting a water seal between soil and drain pipes and water-closets, sinks, and similar receptacles.

The object of the present invention is to devise metal molds whereby the body of the type of trap herein specified may be produced economically and expeditiously.

I have also devised a method which I propose to practice in making the traps, as well as certain improvements in the trap itself, both of which inventions I have embodied in independent applications for patents executed by me of even date with the execution of the present application, and which bear Serial Nos. 191,494, 210,658, and 210,840, and to which reference is here made for a full and explicit description of the inventions which they include.

My present invention embraces means for producing the body of the trap; and the invention consists in a peculiarly-constructed mold by which the first part of the operation of forming the trap—that is, formation of its body—is accomplished.

The novel features and combinations for which protection is desired are specified in the claims at the end of this specification.

In the accompanying drawings, which form part of this description, and in which like features are indicated by like letters, Figure 1 is a vertical section of the mold, the section through the core and its mandrel being taken on the line $x\ x$ of Fig. 3. Fig. 2 is a partly vertical section of the same mold, the section being at right angles to the view shown in Fig. 1. Fig. 3 is a transverse section of Fig. 1, through the line $y\ y$ of the latter figure. Fig. 4 is a top plan view, partly in section, of the core of the mold and its mandrel. Fig. $4^a$ is an elevation of the wedge whereby the core of the mold is expanded; and Fig. 5 is a vertical section, partly in elevation, illustrating a mode of utilizing the mold shown in Figs. 1 to $4^a$. Fig. 6 is an inverted plan view of the core and the mandrel; and Fig. 7 is an enlarged section showing a portion of the lower end of the mandrel, with the screw-threaded end of one of the ribs $j$ extending through the laterally-projecting lug 1 on the mandrel.

Referring to the drawings, the outer sections of the mold are represented by A B C, A being the base, B the intermediate section, and C the top. These parts of the structure are cylindrical, and will be made of cast-iron and of proportions corresponding to the size of the trap-body to be produced. When the mold is being used, the part A is secured to part B by means of the links $a$, pivoted in ears on part A, and eccentric levers $b$, pivoted to the links $a$ and adapted to be locked on the top of the slotted ears projecting from the surface of the section B. These connecting means are well known, and their manner of operation will be readily understood from an inspection of Fig. 1 of the drawings. The part C is in like manner secured to the intermediate section, B.

To insure a reliable connection between the base A and the intermediate section, B, a depression around the edge of one part and a projection at the edge of the other may be provided, as shown in Fig. 1. The base A is provided with a vertical slot and lateral opening at a point in its circumference to receive the lower end of the guide $c'$ of the core-spreading wedge $c$ and its operating-lever $d$.

The top C is provided with the opening $e$, preferably inclined, as shown, and with the steel cut-off plate $f$, which is secured to the operating-spindle $g$, extending through an opening in the dome of the top C and adapted to receive a handle, whereby it may be operated to rotate the cut-off $f$. The cut-off $f$ is slotted, as shown at $h$, the slot corresponding in shape to the lower end of the opening $e$, so that when the cut-off $f$ is turned so that its slot $h$ exactly coincides with the opening $e$ said cut-off will offer no obstruction to the passage of the molten metal through opening $e$. The function of cut-off $f$ will be explained presently. The interior of the top C is made curved on its sides and flat in the bottom, as shown, so as to produce the desired conformation on the exterior of the bottom of the trap-body, and the interior of the intermediate section, B, is cylindrical in outline.

D represents the core, which is of brass, and which is composed of three semi-cylindrical sections, $i$ $i'$ $i^2$, each provided with a central rib, $j$, having an enlarged cylindrical extremity adapted to fit into a cylindrical opening in the cast-iron core-spreading mandrel E. The mandrel E, which may be made hollow, for sake of lightness, besides having the cylindrical openings for the reception of the ribs $j$, is provided, equidistant between two of said openings, with a dovetail recess to receive the guide $c'$ of the expanding-wedge $c$. The wedge $c$ is of the form shown in Fig. 4$^a$, and it occupies a position between two sections of the core, as shown in the cross-section of Fig. 3, the guide $c'$ forming the back of its inner surface and being fitted in the dovetail recess in the core-mandrel, as already explained.

The core D and the core-mandrel E are connected together by the ribs $j$ on the sections of the core and laterally-projecting lugs 1 on the mandrel D, and in each lug is formed an aperture, 2, through which the screw-threaded end of the rib $j$ projects and is secured by a nut, $k$. The mandrel E receives the sectional core D by the ribs $j$ passing into (from the top) the openings 2, formed in the laterally-projecting lugs 1 on the mandrel. When the sectional core has been properly placed on the mandrel, it is secured in a fixed position by means of the nuts $k$, which screw upon the projecting ends of the ribs $j$, the mandrel being cut away at the bottom around the openings therein to furnish room for operating the nuts.

The side walls of the recess in the mandrel for receiving the guide $c'$ of the wedge $c$ are wedge-shaped, and the guide $c'$ is similarly shaped. The rear wall of said recess is straight, but is slightly inclined from the top to the bottom, and the guide $c'$ of the wedge is similarly inclined, as shown in Fig. 2, so that when the wedge is withdrawn or lowered it will permit the sections of the core to readily contract the required extent. The cylindrical openings in the mandrel are slightly larger than the diameter of the cylindrical ends of the ribs $j$, so as to permit the sections of the core to move slightly toward the center of the mandrel when the expanding-wedge has been withdrawn.

The lower end of the wedge $c$ and its guide $c'$ project below the top surface of the bottom section, A, through the vertical opening in said section, as shown. The length of the wedge itself is such that when in its elevated position its lower end is just below the top surface of the section A, as shown at $a^4$, thereby forming a tight joint between the interior of the mold and the opening below the base A at that point in the core occupied by the wedge. The portion of the guide $c'$ which projects through the opening in the base A is of less thickness than the breadth of said opening, so that when the wedge is drawn down the lower end of the guide is afforded lateral play, thus permitting the wedge to move slightly toward the center of the core-mandrel simultaneously with a like movement of the sections of the core, as previously explained. This central contraction of the core and wedge is calculated to be just enough to compensate for the shrinkage of the trap-body while cooling on the core-mandrel, which shrinkage, although slight, invariably takes place under the well-known law that lead in cooling shrinks toward its own center.

In the lateral opening in the bottom section, A, is pivoted at $l$ the lever $d$, whose inner end is provided with an elongated slot, which connects with a pin, $m$, on the lower end of the wedge-guide $c'$, as shown in Fig. 2. The lever $d$ is for elevating and depressing the wedge $c$, and the slot in the end of the lever is to permit the wedge to move laterally when being depressed. Upon the under side of the lever $d$ is a set-screw, $n$, which serves as an adjustable stop to regulate the extent to which the lever may be depressed, and consequently the degree of elevation of the wedge $c$, so that the top of the wedge may be made to fill out evenly and perfect the rounding top of the core D, the top of said wedge being shaped to conform to the contour of the exterior top surface of the said core, as clearly shown in Fig. 2.

In placing the various parts of this mold together, I first connect the core D, core-mandrel E, and wedge $c$ $c'$ together, the wedge as well as the core-sections being slipped into position from the top, and suitably adjust the nuts $k$ in the openings in the bottom of the core-mandrel. The core and its mandrel are then firmly seated on the base A, the tongue at the lower end of the mandrel fitting into a groove and the lower edge of the core seating snugly in a suitable depression in the base A, as shown in Fig. 1. The lever $d$ is then connected to the lower end of the wedge-guide $c'$ and the proper adjustment of the set-screw $n$ made. When the lever $d$ is depressed, so as to throw up the wedge $c$ and expand the core, the outer lower surface of the cylindrical core is caused to press tightly against the outer walls of the depression in the base A, in which the core is seated, thus perfecting the joint at that point. The depression in question is made wider than the thickness of the material composing the core-sections, to enable the latter to contract at the bottom when the wedge is depressed. When the core and its mandrel are properly adjusted upon base A, as explained, the sections B and C of the shell of the mold are placed in position and locked by the eccentrically-pivoted levers $b$. In this position, the wedge $c\ c'$ being elevated in the manner explained, the apparatus is ready to receive the molten lead, which is inserted through the opening $e$. When the mold is full, the handle of spindle $g$ is turned quickly, and the steel cut-off $f$ is caused to smoothly separate the lead at the bottom of the opening $e$, so as to leave the bottom of the seating-surface of the trap-body perfectly even. The elevation of the lever $d$ causes the wedge $c\ c'$ to descend, with the effect of slightly contracting the circumference of the core, in the manner already explained. The top and intermediate sections, B C, are then removed, which, with the fastenings shown, may be done very easily and quickly, and the molded trap-body, with its unfinished neck, is taken off the core, in which condition it is ready for the mouth shaping and finishing mechanism.

Although the molten lead may be successfully inserted into the mold by a ladle, this method would necessarily be tedious and laborious. In the practice of my invention I propose to employ the means shown in Fig. 5 for this purpose, by which the manufacture is greatly facilitated and a superior product produced. In that view, (Fig. 5,) A B C are the outer shells of the mold already described. $A^2$ is a table of suitable dimensions and construction. The top of this table has a central opening, in which is placed and properly guided the shank $a^2$ of the plate $e^2$, to which shank is pivotally connected a lever, $b^2$, having a fixed bearing at $c^2$. The top of the table is provided with a plate, $d^2$, having a central opening. Within this opening is loosely placed the metallic plate $e^2$, and upon the surface of plate $d^2$, near one end, is a lug, $f^2$, provided with a set-screw, $g^2$. The mold is placed in position on table $A^2$, immediately over the loose plate $e^2$, in which position the mouth of the opening $e$ of the mold coincides with the outlet $h^2$ of the melting-pot $i^2$. The pot $i^2$ is of ordinary form, and is set in masonry $j^2\ j^2$ over a furnace. (Not shown.) The outlet $h^2$ of the pot $i^2$ extends through the masonry, and is braced at $k^2$ by any suitable means. The outlet is inclined, as shown, to afford a free flow to the molten metal, and the pot $i^2$ is provided with a valve, $l^2$, whose rod is secured to the rim of the pot at $m^2$. During the operation of casting the valve is permanently raised, and the cut-off for the molten metal is provided by the plunger $n^2$, which is square in cross-section, and which may be reciprocated in the cylinder $o^2$ by the lever $p^2$, pivoted at $r^2$ and connected to the top of said plunger by the link $s^2$, as shown. The cylinder $o^2$ is braced to the masonry at $t^2$, and is connected to the outlet $h^2$, so that the molten metal from the latter may flow into the lower end of the former, as shown in dotted lines. In the position shown the plunger is down, closing the outlet at the end of the cylinder $o^2$. In using this part of the apparatus the mold, being in proper condition, is placed upon the table $A^2$, as shown, and its mouth $e$ is brought in proper alignment with the outlet of the cylinder $o^2$ and maintained in that position by means of the set-screw $g^2$. In this position of the parts the lever $b^2$ is depressed, causing the shank $a^2$ and its connected plate to rise. This movement causes the mold to be elevated until its opening $e$ is in close contact with the end of the outlet $o^2$, and the locking of the lever $b^2$ in the ratchet $u^2$ secures the apparatus in this condition. The valve $l^2$ having previously been opened, the elevation of lever $p^2$ permits the molten metal to flow into the mold, and when it is full and preliminary to operating the cut-off $f$, already described, the lever $p^2$ is suddenly depressed, causing the plunger $n^2$ to descend, with the effect of compacting the lead within the mold before it has sensibly cooled.

I have found by experiment that the effect of a sudden blow upon the molten metal within the mold while it is congealing, but before it has fully set, is to increase the density of the metal and close its pores, thus giving a smooth finish to the article operated upon, and hence producing a more reliable article and enhancing the merchantable qualities of the same.

The mechanism by which the trap-body, as it comes from the mold, is finished by the shaping of its mouth and inserting of the female screw-thread nut will be made the subject of an independent patent.

In using the apparatus herein described the support for the mold will be arranged in convenient proximity to the mouth shaping and finishing mechanism, so that the process of manufacturing may be carried on as expeditiously as if the several parts of the apparatus were mounted upon a single frame, and one melting-pot may be utilized for several plungers by making the pot of sufficient capacity and providing it with several outlets and valves.

Having thus described my invention, what I claim as new, and desire to secure by Letters Patent, is—

1. A contractible core, in combination with a horizontally-divided sectional mold, the top section whereof is provided with an inlet for molten metal, and a cut-off within the mold, the inner surface of which cut-off is on a plane coincident with the plane of the bottom of the casting, substantially as and for the purpose described.

2. A mold having an inlet for the molten metal, in combination with a slotted revoluble cut-off within the mold, the inner surface of which cut-off is on a plane coincident with the plane of the bottom of the casting, substantially as set forth.

3. A contractible core having a dome-shaped top, in combination with a horizontally-divided sectional mold, the inner surface of the top section whereof has curved sides and a flat bottom, and an inlet provided with a revoluble cut-off whose inner surface is on a plane coincident with the plane of the flat bottom of said top section, substantially as set forth.

4. A core-supporting mandrel and a longitudinally-divided sectional core, movably connected to and contractible upon the mandrel, in combination with a horizontally-divided sectional mold, substantially as described.

5. In a mold, a core-mandrel provided with equidistant longitudinal slots, cylindrical in cross-section, in combination with a longitudinally-divided sectional core, each section whereof having a central longitudinal rib with a cylindrical extremity which co-operates with a slot in the mandrel, and an expanding and contracting device, substantially as set forth.

6. The longitudinally-slotted mandrel, in combination with the longitudinally-ribbed sectional core, the screw-threaded adjusting-nuts at the base of the mandrel, and an expanding and contracting device, substantially as set forth.

7. A core-mandrel and a longitudinally-divided sectional core contractible upon the mandrel, in combination with an expanding-wedge operating between two of the core-sections, substantially as set forth.

8. A core-mandrel provided with a longitudinal dovetail slot in its circumference and a longitudinally-divided sectional core contractible upon the mandrel, in combination with an expanding-wedge formed with a dovetail-shaped guide which co-operates with the dovetail slot in the mandrel, substantially as set forth.

9. A core-mandrel provided with a longitudinal dovetail slot in its circumference, the straight or rear wall whereof is inclined from top to bottom, as explained, in combination with an expanding-wedge having a dovetail-shaped guide whose rear wall is inclined to conform to the incline of the rear wall of the slot in the mandrel, and a longitudinally-divided sectional core contractible upon said mandrel, substantially as set forth.

10. A core-mandrel and a longitudinally-divided sectional core contractible upon the mandrel, and having a dome-shaped top, as shown, in combination with an expanding-wedge the top whereof conforms to the contour of the dome of the core, substantially as set forth.

11. The core-mandrel and the longitudinally-divided sectional core, in combination with the expanding-wedge and the lever $d$, pivotally connected to the lower end of said wedge, substantially as set forth.

12. The core-mandrel and the longitudinally-divided sectional core contractible upon the mandrel, in combination with a sectional mold the base-section whereof is provided with a depression for the reception of the lower end of the core, said depression being of greater width than the thickness of the material composing the body of the core, substantially as and for the purpose set forth.

13. A core-mandrel, a sectional contractible core, and an expanding-wedge extending below the bottom of the core, in combination with a sectional mold the base-section whereof is slotted vertically and laterally, and a lever for elevating and depressing the wedge, substantially as shown and set forth.

14. In combination with the mandrel, core, and expanding-wedge, the handle $d$, provided with the set-screw $n$, substantially as set forth.

15. In combination with the melting-pot and a mold, the centrally-slotted table, $A^2$, plate $e^2$, having a shank, as shown, and a lever pivotally connected to said shank, substantially as set forth.

16. The table $A^2$, centrally slotted and provided with the plates $d^2$ $e^2$, the former having a lug, $f^2$, and the latter a shank, $a^2$, in combination with the lever $b^2$, a mold, set-screw $g^2$, and a melting-pot, substantially as set forth.

17. In combination with the mold and means for raising and lowering it, the cylinder $o^2$, provided with a plunger and means for operating it, and a melting-pot, substantially as set forth.

18. The melting-pot $i^2$, having an outlet, as $h^2$, and the cylinder $o^2$, provided with a plunger, in combination with the mold, substantially as set forth.

19. The melting-pot $i^2$, provided with a valve, as shown, and having an outlet, $h^2$, in combination with cylinder $o^2$, provided with a plunger, and the mold, substantially as set forth.

Signed at New York, in the county of New York and State of New York, this 31st day of December, A. D. 1885.

GEO. W. WICKS.

Witnesses:
  HUGO KOELKER,
  J. E. M. BOWEN.